United States Patent [19]

Garuti, Sr. et al.

[11] 4,456,728

[45] Jun. 26, 1984

[54] GROUT RESTORATION

[75] Inventors: John Garuti, Sr.; John Garuti, Jr., both of Flushing, N.Y.; Karl Merkel, Bridgewater, N.J.

[73] Assignee: Super-Tek Products, Inc., Woodside, N.Y.

[21] Appl. No.: 468,728

[22] Filed: Feb. 22, 1983

[51] Int. Cl.³ ............................ C08K 5/11; C09J 3/14
[52] U.S. Cl. .................................... 524/522; 52/309.3; 52/389; 52/390; 524/457; 524/458; 524/460; 524/523
[58] Field of Search ..................... 52/309.3, 389, 390; 524/522, 523, 457, 458, 460

[56] References Cited

U.S. PATENT DOCUMENTS

| | | | |
|---|---|---|---|
| 2,934,932 | 5/1960 | Wagner | 52/747 |
| 3,037,881 | 6/1962 | McDowell | 524/523 |
| 3,300,429 | 1/1967 | Glavis et al. | 524/516 |
| 3,421,277 | 1/1939 | Frischmuth | 428/48 |
| 3,487,031 | 12/1969 | Murei et al. | 524/26 |
| 3,706,696 | 12/1972 | Bernett | 524/388 |
| 3,735,545 | 5/1973 | Bernett | 52/309.3 |
| 3,819,859 | 5/1974 | Mikofalvy | 358/154 |
| 3,845,066 | 10/1974 | Vasta | 524/247 |
| 3,866,383 | 2/1975 | Bernett | 52/309.3 |
| 3,940,358 | 2/1976 | Bernett et al. | 52/309 |
| 4,055,529 | 10/1977 | Burley | 523/122 |
| 4,126,595 | 11/1978 | Martorano et al. | 524/522 |
| 4,143,019 | 3/1979 | Burley | 523/122 |

FOREIGN PATENT DOCUMENTS 57-94072 6/1982 Japan ................... 524/523

Primary Examiner—Ronald W. Griffin
Attorney, Agent, or Firm—Sprung, Horn, Kramer & Woods

[57] ABSTRACT

In a latex coating composition comprising a pigment, a polymeric binder and water, the improvement which comprises incorporating therein about 2 to 20% by total weight of binder of an oligomer of an unsaturated ester having a molecular weight of about 1,000 to 20,000, whereby the coating upon drying is adherent to a vitreous surface but is removable therefrom with alkali. The composition is especially suited for renewing the grout between ceramic tiles.

13 Claims, No Drawings

GROUT RESTORATION

The present invention relates to compositions suitable for restoring grout surfaces between ceramic tiles, to improve the color of the grout and the adhesion between adjacent tiles.

Ceramic tiles are used to cover surfaces in kitchens and bathrooms and other rooms subjected to heat and humidity. The tiles are joined to a substrate and to one another peripherally by cementitious compositions generally comprising inorganic binders, called grout. With the passage of time the grout may become discolored, or portions might become loose or fall away, or portions might be eaten away by acid vapors.

These problems could be dealt with by removing all the tiles, removing from them and the substrate residual grout and re-tiling but that is a huge and expensive task.

Instead it has been proposed to apply certain compositions over the old exposed grout lines. Suitable compositions comprise alkali thickenable acrylic acid-containing polymers, pigments, plasticizers, and solvents. Such compositions indeed adhered to the old grout but they were also readily adherent to the ceramic tile face as well so that, if not promptly removed, they would permanently mar the face. U.S. Pat. Nos. 4,055,529 and 4,143,019 state that "thin layers of the dressing which were allowed to dry were difficult to remove."

It is accordingly an object of the present invention to provide a composition for application on old grout which is free of the foregoing disadvantages.

These and other objects and advantages are realized in accordance with the present invention pursuant to which a latex coating composition also applicable as a caulking compound and comprising a pigment, a polymeric binder and water, is modified by incorporating therein about 2 to 20% by total weight of binder of an oligomer of an unsaturated ester having a molecular weight of about 1,000 to 20,000, whereby the coating upon drying is adherent to a vitreous surface but is removable therefrom, with alkali. Advantageously the oligomer comprises units of an alkyl ester of an ethylenically unsaturated acid, optionally along with about 5 to 50 mol % of ethylenically unsaturated acid per se.

The oligomer advantageously has a molecular weight of about 5,000 to 10,000 and is a copolymer with about 10 mol % of acid. The alkyl moieties generally have up to 8 carbon atoms, preferably up to 4, and the ethylenically unsaturated acids are advantageously alkenes of up to about 4 carbon atoms carrying 1 or 2 carboxylic acid groups, e.g. maleic, fumaric, itaconic and especially (meth) acrylic acid. A preferred oligomer comprises by weight 30-52/62-40/8-10 methyl methacrylate/butyl acrylate/acrylic acid.

It is highly advantageous for the coating composition also to contain about 5 to 20%, preferably about 10%, by weight based on total binder solids of a polymer containing pendent carboxylic acid groups and having a Tg below about 0° C., preferably below about $-20°$ C., this component contributing greatly to the adhesion and flexibility properties. Its molecular weight advantageously is quite high, e.g. 500,000 or even 1,000,000 or more. The polymer may comprise alkyl esters of unsaturated acids as hereinabove described with at least about 0.25 up to about 5 mol % of unsaturated acids, as described. A preferred material comprises a copolymer of butyl acrylate with about 1 mol % of methacrylic acid.

Another key ingredient which imparts to the composition high viscosity, so that it will stay where put on a vertical wall without sagging, comprises an alkali-swellable polymer of an ethylenically unsaturated acid, such as a high molecular weight poly (meth) acrylic acid. This may be present in about 1 to 10%, preferably about 3%, by weight based on total binder solids in the composition.

Turning now to the basic latex composition of pigment and binder, the pigment may comprise any of those conventionally employed in paints, such as rutile titanium dioxide, aluminum silicate, magnesium silicate, calcium carbonate, silicon dioxide, carbon black, various iron oxides, etc. The binder may comprise polymers of alkyl esters of ethylenically unsaturated acids, as described, polyvinyl acetate, polyvinyl chloride, styrene/acrylic, ethylene-vinyl acetate copolymers, etc. Polymers of methyl methacrylate, ethyl acrylate, butyl acrylate, 2-ethyl-hexyl acrylate and up to about 1% of (meth) acrylic acid have proven quite satisfactory.

Other ingredients such as biocides, surface active agents, fillers, e.g. attapulgite clay, silica, and the like, may be added in minor amounts to improve the rheological properties or to impart other properties thereof.

A small amount of high boiling solvent, e.g. about 0.5% of butyl cellosolve, promotes penetration and fusion of the polymer particles in the latex.

In accordance with a special aspect of the invention there can be included about 0.5 to 2.5% by weight of the polymer solids in the composition of a 15% solution zinc oxide-ammonium carbonate complex, this serving to increase the resistance to water, grease, oil and aliphatic organic solvents.

The proportions of solids and polymers are such that on an overall basis the composition after drying has a PVC (pigment volume concentration) of less than about 40% and preferably less than about 35%. This means that the composition is high in binder, low in pigment, i.e. if the water is allowed to evaporate then in a liter of coalesced binder there will be less than about 400 cc and preferably less than about 350 cc of pigment and fillers, calculated on the volume of the initial dry powdered pigment and/or filler.

Advantageously the composition also contains an alkali, preferably volatile like ammonia, in an amount sufficient to render it alkaline, e.g. a pH above about 8, since this is what causes the carboxyl-containing polymer molecules to swell to impart to the final coating formulation a viscosity in excess of 100,000 cP, e.g. 500,000 cP or more.

As noted, the novel compositions are characterized by the ability to be applied to existing ceramic tile installations where they will adhere to the old grout but, while superficially adherent to the tile as well, can readily be wiped away therefrom with a sponge dipped in alkali, e.g. an ammonia-containing household cleanser. This wipability is evident even as long as 24 hours after application. The new film adheres tenaciously to itself so multiple films can be built up or repairs made, but it also adheres tenaciously even to old grout which is twenty or more years old and which has been exposed to bathroom steam, oils and greases.

The new coating is substantially invisible except for the color of the pigments and fillers so that, if only a portion of a bathroom wall is treated, if the untreated portion is of the same color there will be no visible demarcation line. The new facing is highly flexible so that it will not crack even if subjected to normal vibrations of the underlying wall board due to truck and plane traffic, etc.

The composition can be applied by fingertip wiping along the grout lines, will fill all cracks and depressions and will not sag. Upon drying no shrinking or cracking of the coating is evident so that one applies it in approximately the final volume desired.

The invention will now be described in further detail in the following illustrative examples wherein parts are by weight and mw is weight average unless otherwise expressed:

EXAMPLE 1

Into a mixing vessel with agitation there are charged, in pounds,

| | |
|---|---|
| Water | 2.36 |
| Propylene glycol | 3.74 |
| Tamol 731 (anionic dispersing agent) | 0.57 |
| Deefo 2001-1 (defoamer) | 0.13 |
| Dowicil 75 (20% aqueous solution of biocide) | 0.44 |
| Rutile TiO$_2$ | 10.06 |
| CaCO$_3$ | 11 |

The contents are then dispersed at high shear for 35 minutes until a Hegman 5 degree of dispersion is achieved. The speed is reduced and the following are added, in pounds by weight:

| | |
|---|---|
| Oligomer 10,000 mw (40/50/10 methyl methacrylate/butyl acrylate/acrylic acid) | 5.67 |
| Emulsion high mw acrylate ester copolymer | 55.14 |
| Emulsion high mw butyl acrylate copolymer, Tg-32° C. | 5.10 |
| Butyl cellosolve | 0.52 |
| Deefo 2001-1 | 0.13 |
| High mw cross-linked polyacrylic acid emulsion | 2.87 |
| Attapulgite clay | 1.69 |
| Deefo 2001-1 | 0.13 |
| NH$_4$OH | 0.45 |

The mass is stirred for about 1 hour until there is achieved a viscosity of about 520,000 to 600,000 cP. The composition has a pH of 9, a non-volatile content of about 55.58% by weight, a PVC of 20.23%, a pigment-:binder weight ratio of 0.69:1 and a weight per gallon of 10.45 pounds.

Upon application to a ceramic tiled surface along the old grout lines it adheres to the old grout and a sponge wet with ammonia-containing cleaner removes it from the tiles but not from the old grout.

EXAMPLE 2

Example 1 is repeated except that after addition of the NH$_4$OH there are added 4.14 pounds of a 15% zinc oxide-ammonium carbonate complex solution. The composition performs well and exhibits increased resistance to water, grease, oil and aliphatic organic solvents.

As indicated hereinabove, the basic binder of the latex formulation need not be solely acrylate-based but could be based in whole or in part on polyvinyl acetate, polyvinyl chloride, styrene/acrylic, ethylene-vinyl acetate copolymer, etc. This might require some modification in the oligomer, etc., to give the same maximum performance described and it is intended that the following claims embrace such and other obvious modifications which will readily suggest themselves to those skilled in the art.

We claim:

1. In a latex coating composition comprising a pigment, a polymeric binder and water, the improvement which comprises incorporating therein about 2 to 20% by total weight of binder of a thermoplastic oligomer of an unsaturated ester having a molecular weight of about 1,000 to 20,000, and a Tg below about 0° C., the polymeric binder being thermoplastic and having a molecular weight of at least about 500,000, the composition being highly viscous, whereby the coating upon drying is adherent to a vitreous surface but is removable therefrom with alkali.

2. A composition according to claim 1, wherein the oligomer comprises units of an alkyl ester of an ethylenically unsaturated acid.

3. A composition according to claim 2, wherein the oligomer further comprises units of an ethylenically unsaturated acid present in about 5 to 20 mol %.

4. A composition according to claim 3, wherein the alkyl ester units comprise alkyl esters of (meth)acrylic acid and the ethylenically unsaturated acid comprises (meth)acrylic acid.

5. A composition according to claim 1, further comprising about 5 to 20% by weight based on total binder solids of a polymer containing pendent carboxylic acid groups and having a Tg below about 0° C.

6. A composition according to claim 5, wherein the polymer comprises a copolymer of an alkyl (meth)acrylate and (meth)acrylic acid.

7. A composition according to claim 5, further comprising about 1 to 10% by weight based on total binder solids of an alkali-swellable polymer of an ethylenically unsaturated acid.

8. A composition according to claim 1, further comprising about 0.5 to 2.5% of zinc oxide-ammonium carbonate complex based on the weight of polymer solids.

9. A composition according to claim 1, having a PVC of less than about 40%.

10. A composition according to claim 1, wherein the polymeric binder comprises a high molecular weight polymer of an alkyl ester of (meth)acrylic acid.

11. A composition according to claim 10, wherein the oligomer is present in about 5 to 15% by total weight of binder and comprises units of an alkyl ester of (meth)acrylic acid and about 5 to 20 mol % of (meth)acrylic acid units, the composition further comprising about 5 to 20% by weight based on total binder solids of a copolymer of an alkyl (meth)acrylate and (meth)acrylic acid having a Tg below about 0° C., about 1 to 10% by weight based on total binder solids of an alkali-swellable polymer of (meth)acrylic acid, and alkali in an amount sufficient to impart a pH of at least about 8, the composition having a PVC of less than about 40%.

12. A composition according to claim 1, having a viscosity in excess of about 100,000 cP.

13. In the restoration of grout holding tiles in place by applying to the grout a polymeric composition, allowing the composition to secure itself to the grout, and thereafter wiping away any composition adhering to the face of the tiles, the improvement which comprises employing as the composition a composition according to claim 1.

* * * * *